United States Patent [19]

Lucree

[11] Patent Number: 5,791,732
[45] Date of Patent: Aug. 11, 1998

[54] ANTI-BACTERIAL BABY SEAT

[76] Inventor: Teresa Nan Lucree, 21953 Beverly Ave., Port Charlotte, Fla. 33952

[21] Appl. No.: 858,889

[22] Filed: May 19, 1997

Related U.S. Application Data

[60] Provisional application No. 60/039,024 Feb. 21, 1997.

[51] Int. Cl.$^6$ ............................................. A47D 1/10
[52] U.S. Cl. ...................... 297/256.17; 297/219.12; 297/218.4; 297/228.11; 297/229
[58] Field of Search .................. 297/256.17, 219.12, 297/226, 218.4, 228.11, 219.1, 218.3, 218.2, 228, 228.1, 229; 280/33.992, 33.993; 150/157, 158

[56] References Cited

U.S. PATENT DOCUMENTS

| | | | |
|---|---|---|---|
| 2,483,223 | 9/1949 | Moss | 297/228.11 |
| 3,578,380 | 5/1971 | Jacobus | 297/229 |
| 3,596,989 | 8/1971 | Van Ryn | 297/228.11 |
| 4,526,420 | 7/1985 | Kawamura et al. | 297/226 |
| 4,761,032 | 8/1988 | Sanchez et al. | 297/229 |
| 5,096,260 | 3/1992 | Hagerstrom | 297/256.17 |
| 5,238,293 | 8/1993 | Gibson | 297/229 |

*Primary Examiner*—Peter M. Cuomo
*Assistant Examiner*—Anthony D. Barfield
*Attorney, Agent, or Firm*—Frank A. Lukasik

[57] ABSTRACT

A sanitary liner for a shopping cart infant seat consisting of a seat area shaped to fit within the space for the infant seat area, a flexible rim stitched to the top of the seat area and encircling the seat area, a narrow, flat, steel wire stitched to the bottom side of the rim and located between the outer edge and the seat area and encircling the seat area, and a plurality of straps stitched to the flexible rim bottom side for securing the liner within the shopping cart infant seat.

6 Claims, 10 Drawing Sheets

ANTI-BACTERIAL BABY SEAT

RELATED APPLICATION

This is a Continuation-In-Part of Provisional application Ser. No. 60/039,024, Filed Feb. 21, 1997.

BACKGROUND OF THE INVENTION

1. Field of the Invention

This invention relates generally to shopping carts and more specifically to a baby seat cover for shopping carts.

2. Discussion of the Prior Art

There are numerous products on the market for holding babies in cars and other vehicles. Shopping carts are designed to provide a seat for the baby. The cart generally has a basket seat with two leg holes formed into the front, facing the push handle. A seat belt is usually provided to protect the infant from falling out of the cart seat. The seat usually has two flaps forming part of the seat when occupied and which can be rotated upwardly to block the leg holes when a baby is not present and the shopper wishes to store articles in the seat portion.

Infant seats similar to the type used in automobiles are sometimes provided by the store or brought in by the infant's parent and inserted in the area formed by the infant seat of the cart. The store seat is placed in the area formed in the cart for the infant and fastened in place. If the seat is provided by the store, it has been used repeatedly by many infants and usually carries bacteria left by previous occupants. The seat carried by the child's parent is bulky and may not fit in the cart space. In addition, carrying the seat into the store is an additional burden.

Currently, a child is placed in the shopping cart seat, strapped in, and the parent begins to shop. An observer can readily notice that babies tend to place everything in their mouths, including the parts of the cart, namely the front and side rails. Furthermore, infants occasionally have an accident and mess their diapers, and very often, the shopping cart. In addition to spreading any bacteria that is present in the diaper, additional bacteria is spread from one child to the other by merely touching the cart and then placing their hands in their mouths.

SUMMARY OF THE INVENTION

The present invention provides a more convenient means for providing a sanitary liner for a shopping cart infant seat. The invention is made of a fabric, such as nylon, cotton, waterproof material, or other suitable material. The seat area is shaped to fit within the space for the child and an oversize rim is sewn around the periphery. Two adjustable size leg holes are provided in the front to accommodate the child's legs. Two slits are provided in the rear to insert the seat belts currently available in shopping carts. In addition, a convenient, snap on belt is provided with the invention.

Four straps are attached to the underside of the rim for fastening to the cart frame to retain the liner within the seat area.

The rim is held extended by a narrow, flat, steel wire to provide stability and ease of application for use and easy storage. To fold for storage, two corners nearest the user are grasped and folded towards each other to form a product that is reduced by two thirds in area when folded for carrying and storing. The folded liner is thus reduced to less than two thirds the size of the opened liner. The liner may be laundered as any other fabric to provide a continuous anti-bacterial environment for the child.

2

DESCRIPTION OF THE PREFERRED EMBODIMENT

Figure 1:
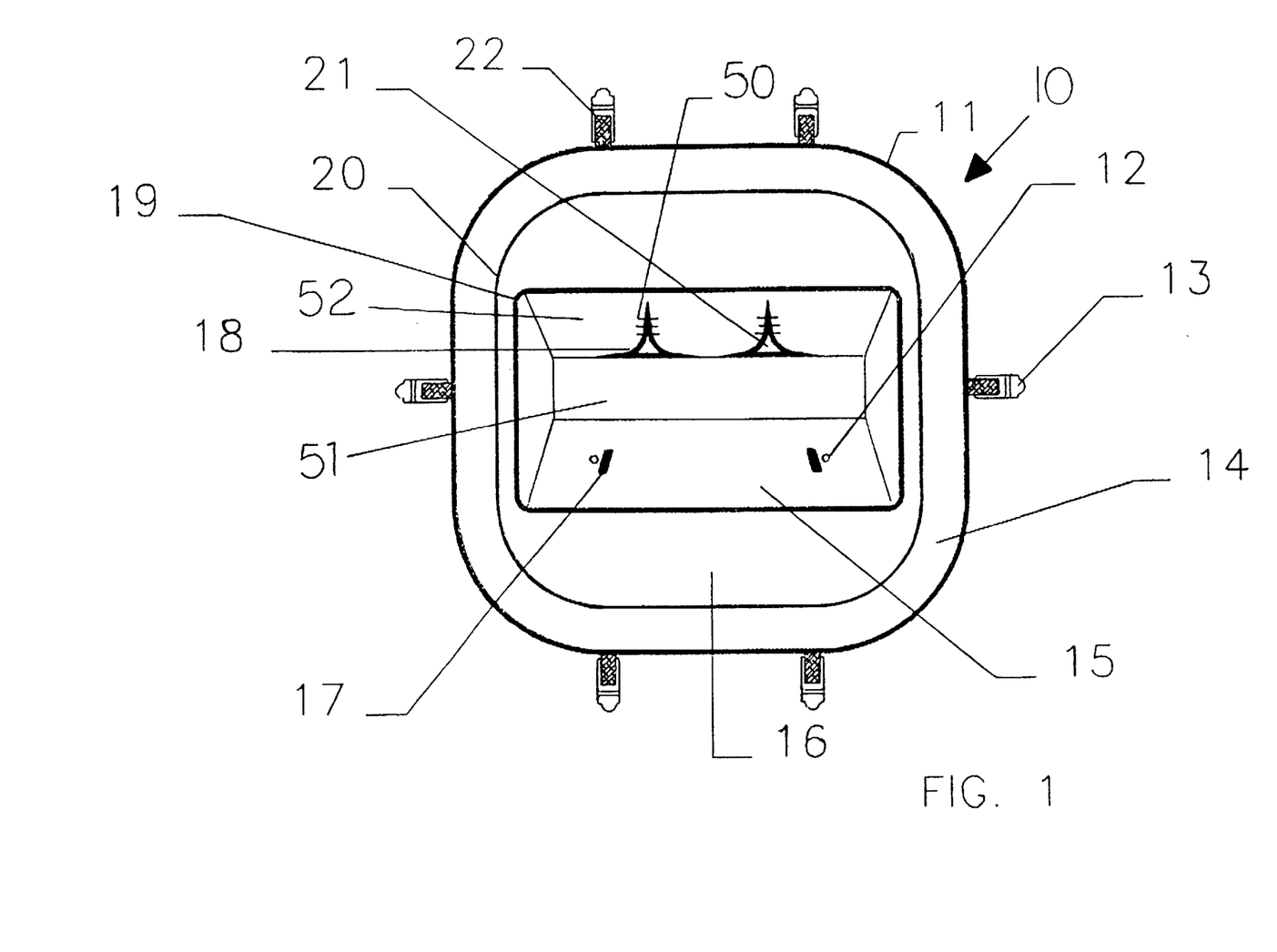
FIG. 1 is a top perspective view of the baby seat cover for shopping carts in accordance with the invention.
Figure 2:
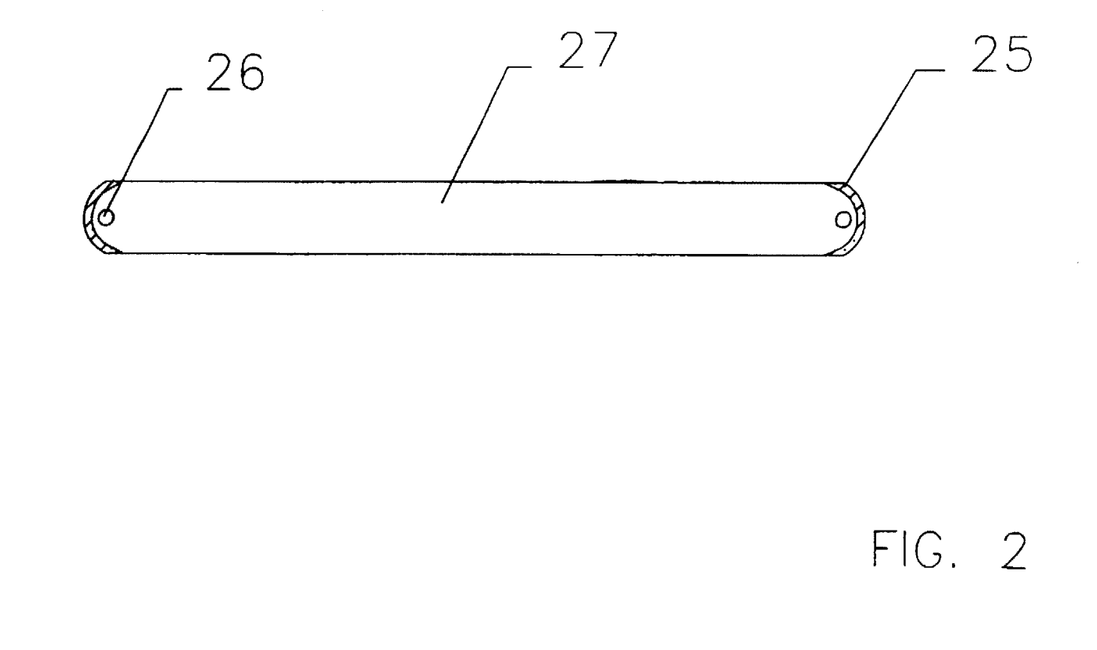
FIG. 2 is a top view of the snap belt in accordance with the invention.

The baby seat of the invention is indicated generally by the numeral 10 in the top perspective view shown in FIG. 1. The baby seat 10 may be made from any fabric, including nylon, cotton, or other suitable material. A water repellent of water proof material would be preferred.

Figure 7:
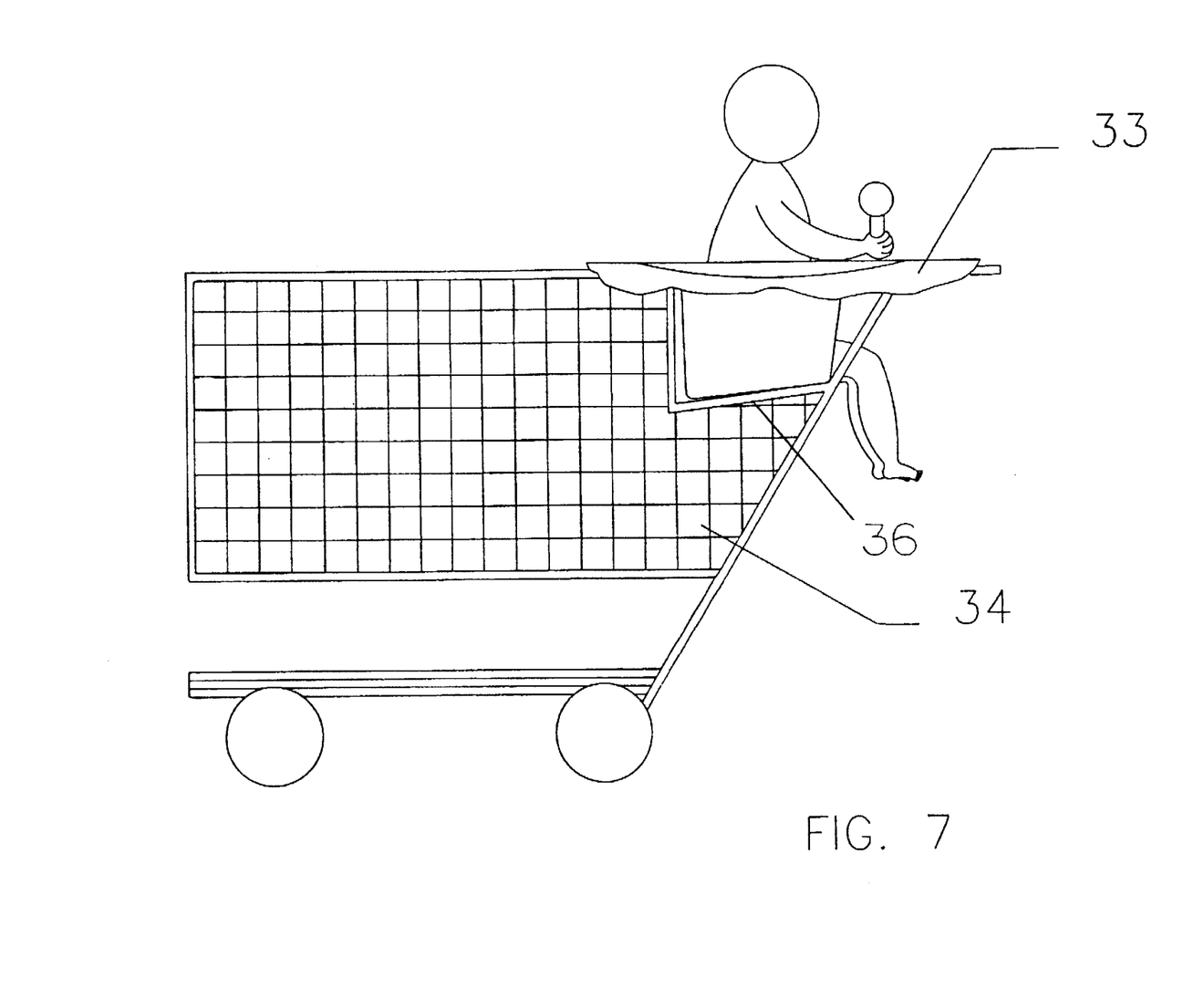
FIG. 7 is a side view of the baby seat installed in a shopping cart.
Figure 8:
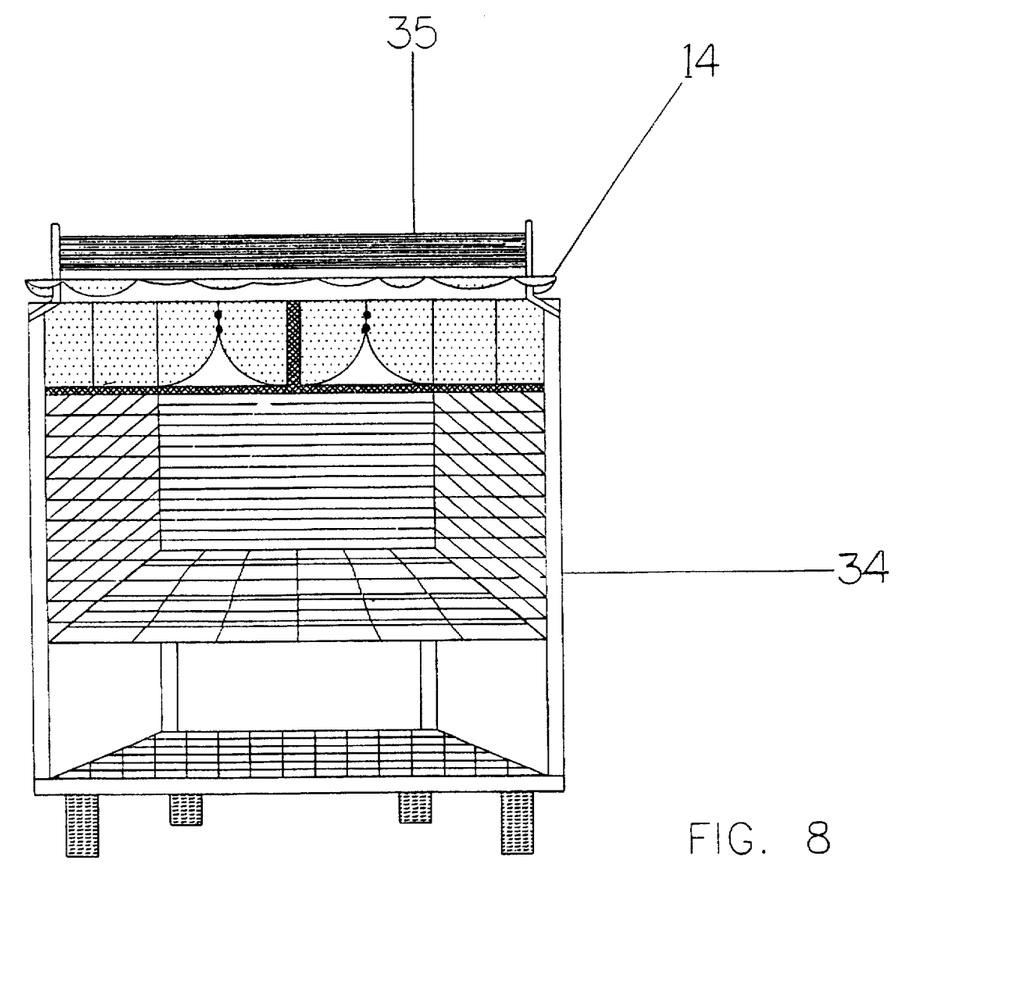
FIG. 8 is a frontal view of the baby seat installed in a shopping cart.
Figure 9:
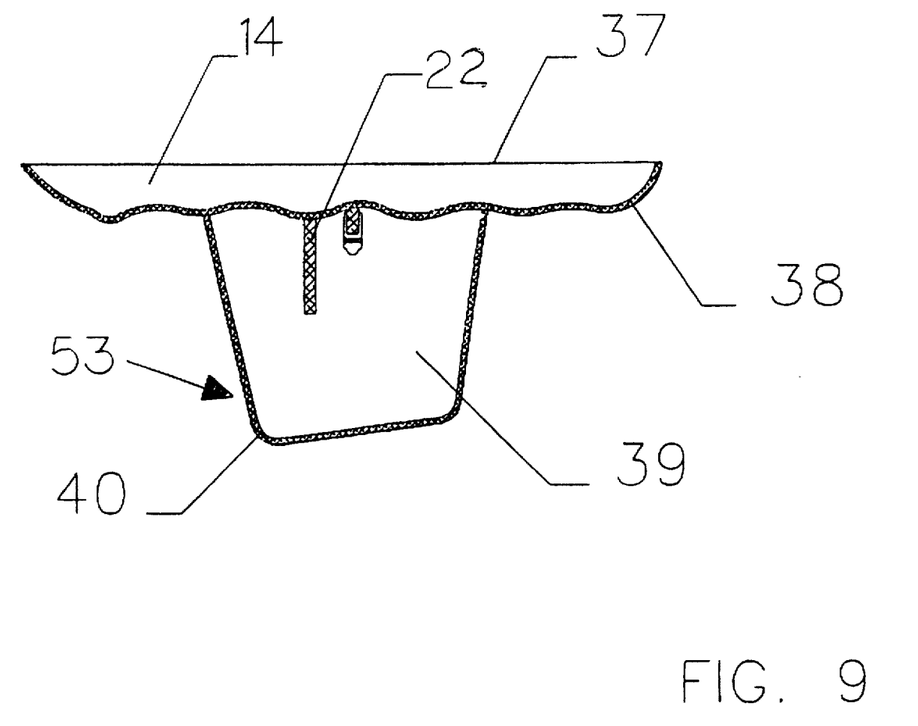
FIG. 9 is a side view of the baby seat.

FIGS. 7 and 8 also show the relationship between the baby seat 10, installed in a shopping cart 34 with a baby seated in the baby seat.

FIG. 1 is a top view of the baby seat 10 in an extended position. The outer edge 11 is cut and covered with trim 28 fastened with stitching 32, to form a rectangular shape with rounded corners and sufficiently large to cover the shopping cart infant seat 36 and the surrounding structure of the infant seat 36. In most cases, the outer edge 11 will cover the handle 35 of the shopping cart 34 as well. The seat cover portion consists of a single fabric panel forming the bottom panel 51 and the back panel 15. Two side panels 39, when sewn together with the bottom panel 51 and back panel 15, are used to cover the inside of infant seat 10. Front panel 52 completes the enclosure forming the seat 10. Outer trim 41 is stitched around the seam where the front panel 52, the bottom panel 51, and the back panel 15 are joined at the edge.

The adjustable leg openings 21 are cut in the front panel 52. Leg openings 21 are cut in the front panel 52 and care trimmed with stitching around the open space created by the leg openings 21 cuts. The leg openings 21 are in the form of a slit to provide access for the infant's legs. The leg openings 21 are held in a partially closed position by stitching 50. As the child grows, the stitching 50 may be removed one at a time to open the space as the child grows. The smaller opening 21 will keep the baby's legs from moving sideways in the baby seat 10.

The leg openings 21 are shown stitched in a partially closed position by stitching 50 to indicate the smallest leg opening which would be required for a very small infant. As the infant grows and the legs become larger, a second stitch 50 may be removed. The original leg openings 21 have been sized to fit the smallest to the largest infant to be carried in the baby seat 10.

The assembled and stitched seat cover portion 53 is then attached to the flexible flap 14 by covering the stitching with a bias tape 20, inner trim 19 and then sewing them together. The seat cover portion 53 is three dimensional and formed to conform to the shape of the cart infant seat 36. The outer edge flexible flap 14 is sufficiently large to cover all parts of the shopping cart 34 which would be within the reach of the baby.

A pair of slits 17 may be cut and edged in the back panel 15 of the seat cover portion 52 to accommodate the seat belts (not shown) currently available in many shopping carts 34. After the baby seat 10 is positioned in the infant seat 36 and the baby is seated, the seat belt is led through the slits 17 and fastened around the babies waist. Snaps 12 may be provided on the seat back 15 to hold belt 27 when used as a baby seat belt if desired. Use of the belt 27 will eliminate the need for using the seat belt contained on the cart 34 to further cover the seat belt of the cart 34 and isolate the baby from further contamination.

Figure 6:
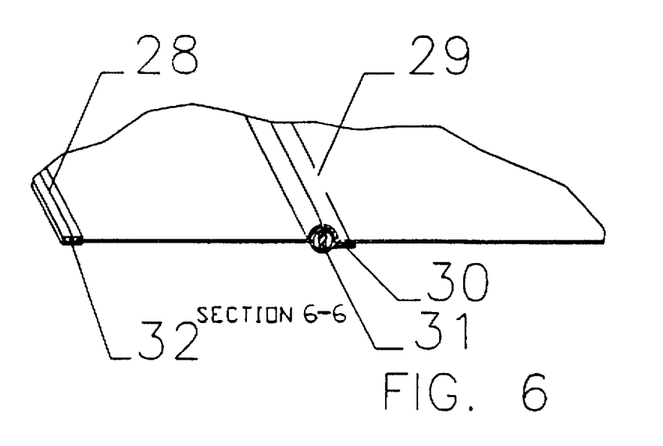
FIG. 6 is a sectional view of the wire assembly in accordance with the invention.

FIG. 6 is a sectional view of the outer edge trim 11. Also shown is the bias tape cover 30 wrapped around the steel wire 31 and stitched 29 to the flexible flap 14 at approximately 2½" from the outer edge trim 11.

Figure 4:
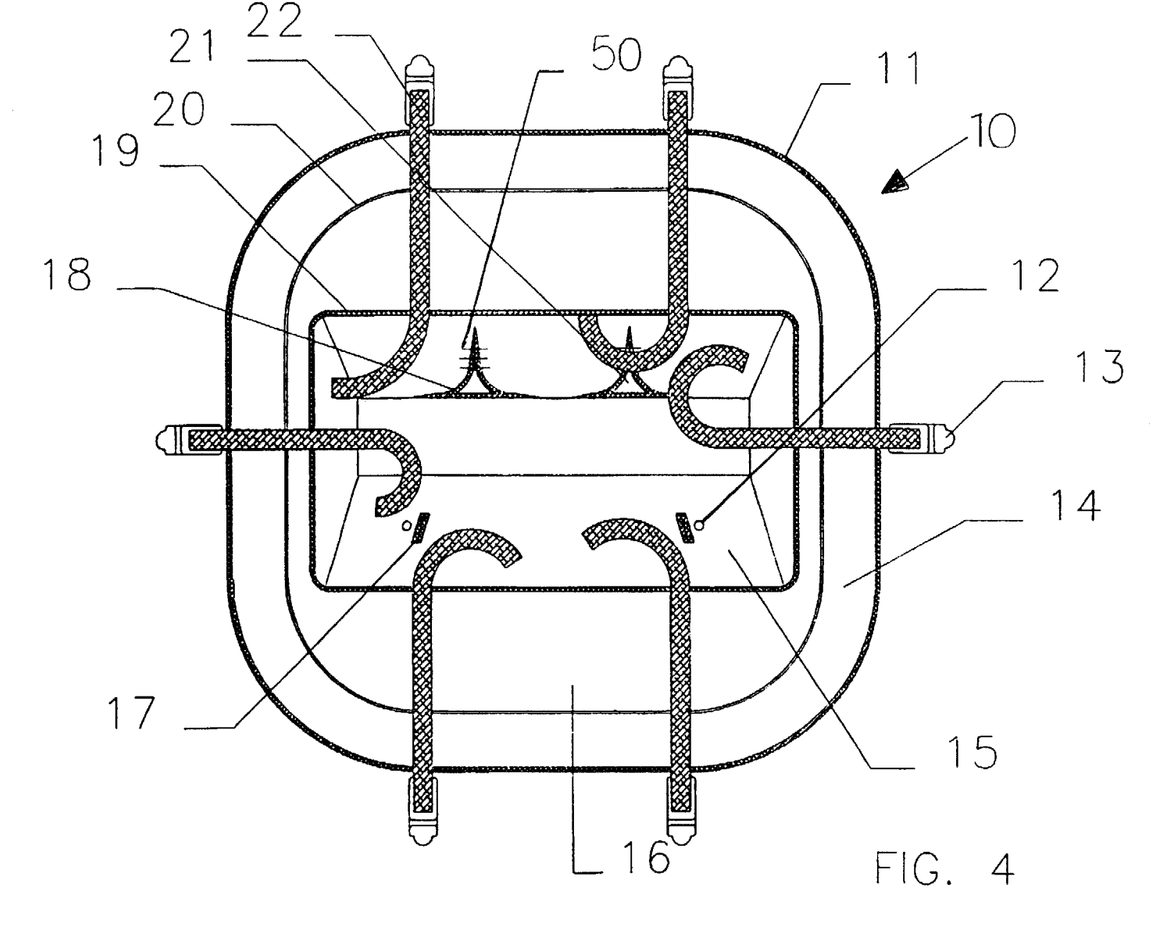
FIG. 4 is a bottom perspective view of the baby seat cover for shopping carts in accordance with the invention.
Figure 5:
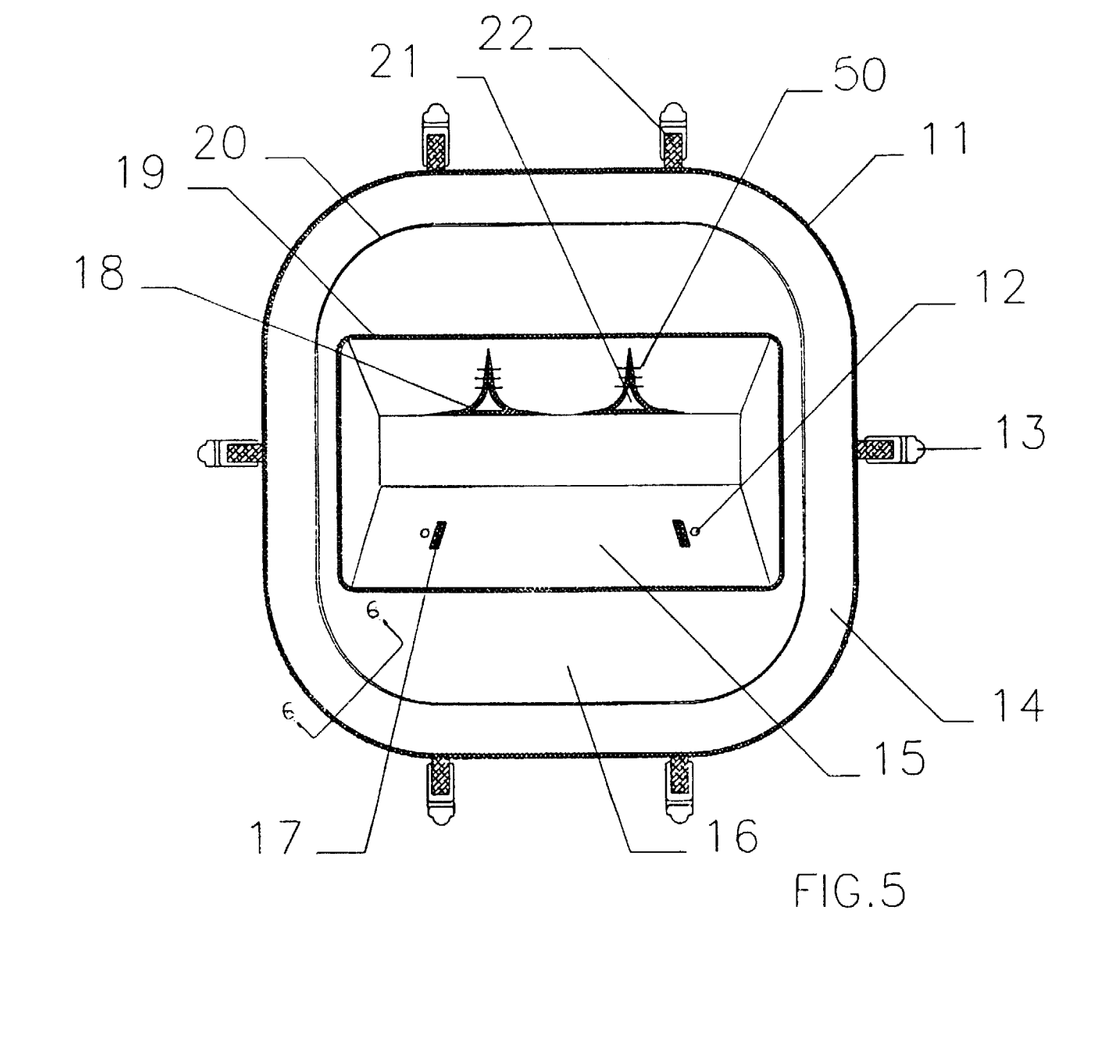
FIG. 5 is a top view of the baby seat showing the relationship of the flexible steel wire in accordance with the invention.

FIG. 4 is a bottom view of the baby seat 10 showing the locations of the straps 22 on the baby seat 10. Each of the straps 22 are fastened to the flexible flap 14 by stitching to the flexible flap 14 at the point where the bias tape 30 fastens the steel wire 31 to the flexible flap 14. A second mounting stitch for the straps 22 is placed at bias tape 19 connection of the seat cover portion 53 to the flexible flap 14.

Figure 3:
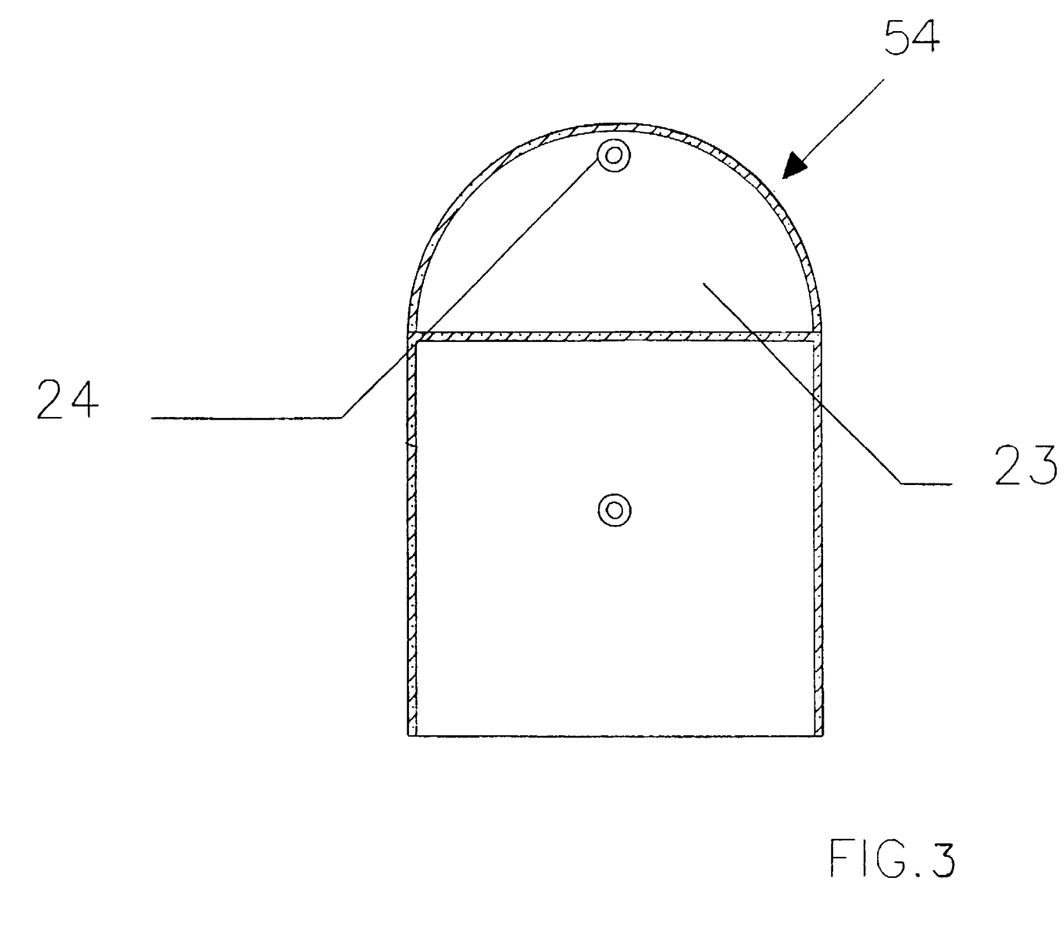
FIG. 3 is a front view of a pocket for attachment to the cover in accordance with the invention.

FIG. 3 shows an accessory pocket 54 having a cover 23 and a two part snap fastener 24 for securing the cover in a closed position. The pocket may be stitched to any of the sides to provide a convenient storage for personal items.

In actual use of the baby seat 10 of the invention, the adult places the baby seat 10 over the area of the infant seat 36 and the surrounding stainless steel wires including the handle 35 if appropriate. The straps 22 are then wrapped around the wire frame of the shopping cart 34 and buckled up. Pulling the straps 22 tightly will assure that all of the structure within reach of the baby will be covered by the baby seat 10.

Figure 10:
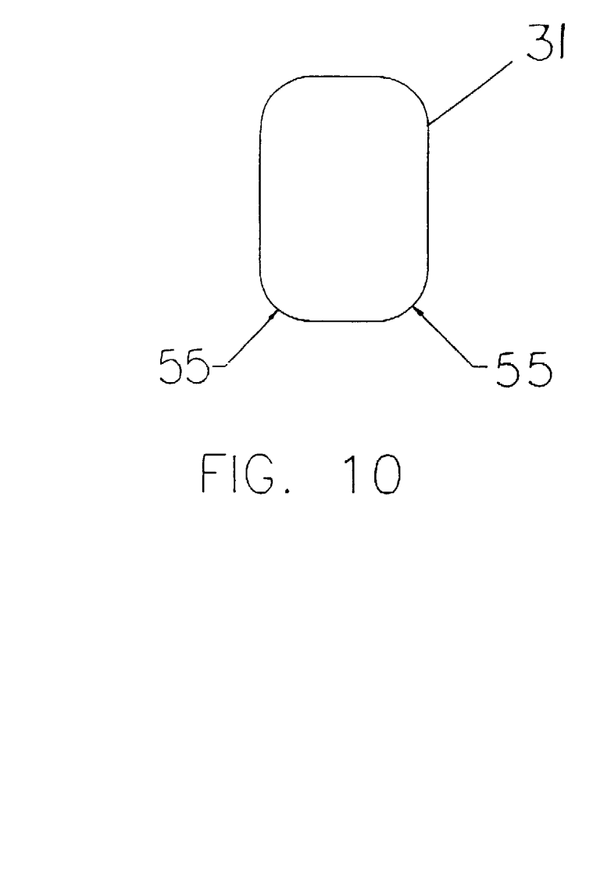
FIG. 10 is a top view of the steel wire in the first step of folding in accordance with the invention.
Figure 11:
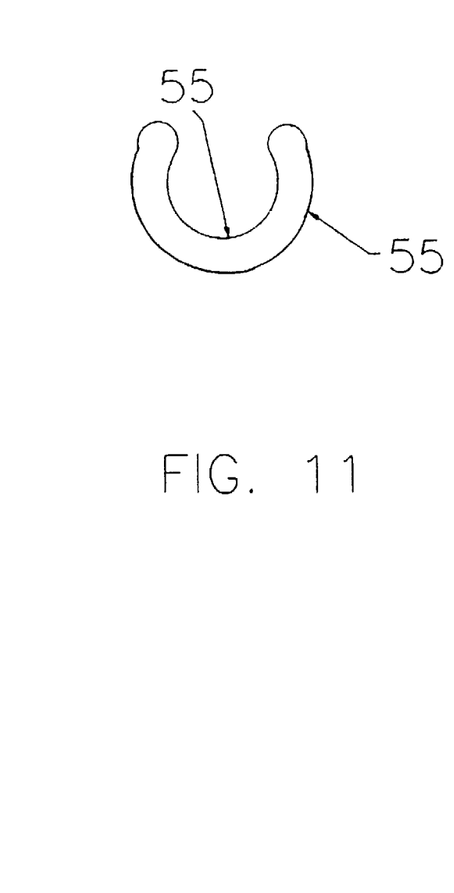
FIG. 11 is a top view of the steel wire in the second step of folding in accordance with the invention.
Figure 12:
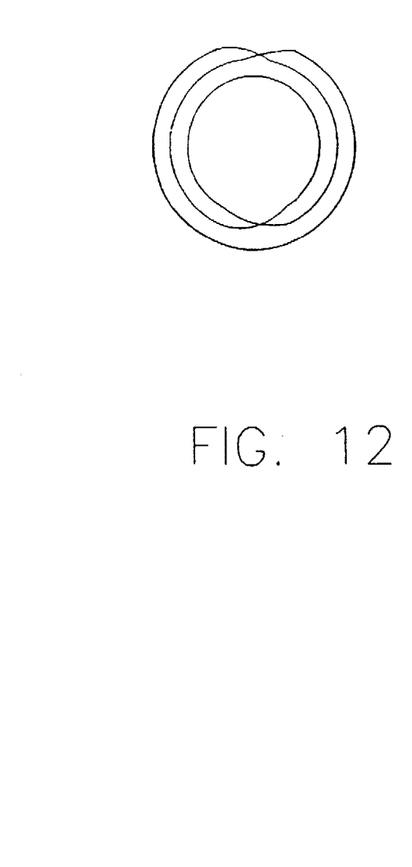
FIG. 12 is a top view of the steel wire in a folded position in accordance with the invention.

Referring to FIGS. 10–12, the steps for folding the baby seat 10 are shown. The wire 31 is gripped with one hand at each of the locations shown by the arrows 55. The section of the wire 31 furthest from the operator, is pulled in as shown in FIG. 11. The wire 31 will automatically mold into the shape shown in FIG. 12. From this point, the baby seat 10 can easily slip into a carrying bag for easy, compact handling.

While the invention has been explained with respect to a preferred embodiment thereof, it is contemplated that various changes may be made in the invention without departing from the spirit and scope thereof.

What is claimed is:

1. A sanitary liner for a shopping cart infant seat comprising:

a seat area adapted to fit within a space of the infant seat, said seat area having a top end, a front, a back, and two sides, said front having two adjustable size leg openings formed therein, said back having two slits for accommodating shopping cart seat belts, and two snap fittings for attaching a removable snap-on seat belt, a flexible rim stitched to said top end of said area, and encircling said seat area, said rim having a top side and a bottom side, and an outer edge, a narrow, flat, steel wire stitched to said bottom side of said rim, said steel wire located between said outer edge and said seat area and encircling said seat area, and a plurality of straps stitched to said flexible rim bottom side for securing the seat liner within the shopping cart infant seat.

2. The sanitary liner for a shopping cart infant seat of claim 1 wherein said flat steel wire is a continuous loop, wrapped with a bias tape and stitched to said flexible rim at a distance in a range between two inches and three inches.

3. The sanitary liner for a shopping cart infant seat of claim 1 wherein a seat belt is fastened to said snap fittings.

4. The sanitary liner for a shopping cart infant seat of claim 1 wherein a snap top pocket is applied at the top end of the seat area.

5. A sanitary liner for a shopping cart infant seat comprising:

a a seat area adapted to fit within a space for the infant seat, said seat area having a top end, a front, a back, and two sides, said front having two adjustable size leg openings formed therein, said back having two slits for accommodating shopping cart seat belts, and two snap fittings for attaching a removable snap-on seat belt, a flexible rim stitched to said top end of said seat area, said rim having a top side and a bottom side, and an outer edge, a continuous loop formed by a narrow, flat, steel wire wrapped with a bias tape and stitched to said flexible rim encircling said seat area at a distance in a range between two inches and three inches from said outer edge, and a plurality of straps stitched to said flexible rim bottom side for securing the seat liner within the shopping cart infant seat.

6. The sanitary liner for a shopping cart infant seat of claim 5 wherein a storage pocket is sewn to said seat area for holding personal items.

* * * * *